United States Patent [19]
Perlin

[11] Patent Number: 6,031,525
[45] Date of Patent: Feb. 29, 2000

[54] METHOD AND APPARATUS FOR WRITING

[75] Inventor: Kenneth Perlin, New York, N.Y.

[73] Assignee: New York University, New York, N.Y.

[21] Appl. No.: 09/053,502

[22] Filed: Apr. 1, 1998

[51] Int. Cl.[7] ................................................. G09G 5/00
[52] U.S. Cl. ...................... 345/173; 345/179; 345/168; 178/18.01; 178/19.01; 178/19.03; 178/19.04
[58] Field of Search .................................. 345/168, 173, 345/179; 178/18.01, 18.03, 18.06, 18.07, 19.01, 19.02, 19.04, 19.05

[56] References Cited

U.S. PATENT DOCUMENTS

| | | | |
|---|---|---|---|
| 4,559,598 | 12/1985 | Goldwasser et al. | 345/173 |
| 5,319,386 | 6/1994 | Gunn et al. | 345/173 |
| 5,416,904 | 5/1995 | Arai et al. | 345/179 |
| 5,523,775 | 6/1996 | Capps | 345/179 |
| 5,625,354 | 4/1997 | Lerman | 345/179 |
| 5,956,021 | 9/1999 | Kubota et al. | 345/173 |
| 5,959,629 | 9/1999 | Masui | 345/189 |

*Primary Examiner*—Bipin Shalwala
*Assistant Examiner*—Vincent E. Kovalick
*Attorney, Agent, or Firm*—Ansel M. Schwartz

[57] ABSTRACT

The present invention pertains to an apparatus for writing. The apparatus comprises a writing mechanism. The apparatus comprises a tablet surface sensitive to the position of the writing mechanism and able to detect whether the writing mechanism is in contact with the surface. The apparatus comprises a computer processor which identifies a writeable character from the motion of the writing mechanism from a resting zone into an other zone of a plurality of zones when the writing mechanism is in contact with the surface. The computer processor defines the surface into the resting zone and enough other zones to identify a written alphabet. Each other zone is in contact with the resting zone. The present invention pertains to a method for writing. The method comprises the steps of moving a stylus from a resting zone on a tablet surface to at least an other zone of a plurality of zones in contact with the resting zone while the stylus is in continuous contact with the surface. The surface is sensitive to the position of the writing mechanism and able to detect whether the writing mechanism is in contact with the surface. Then there is the step of identifying a letter with a processor in contact with the surface from the movement of the stylus from the resting zone to at least the other zone and back to the resting zone.

14 Claims, 2 Drawing Sheets

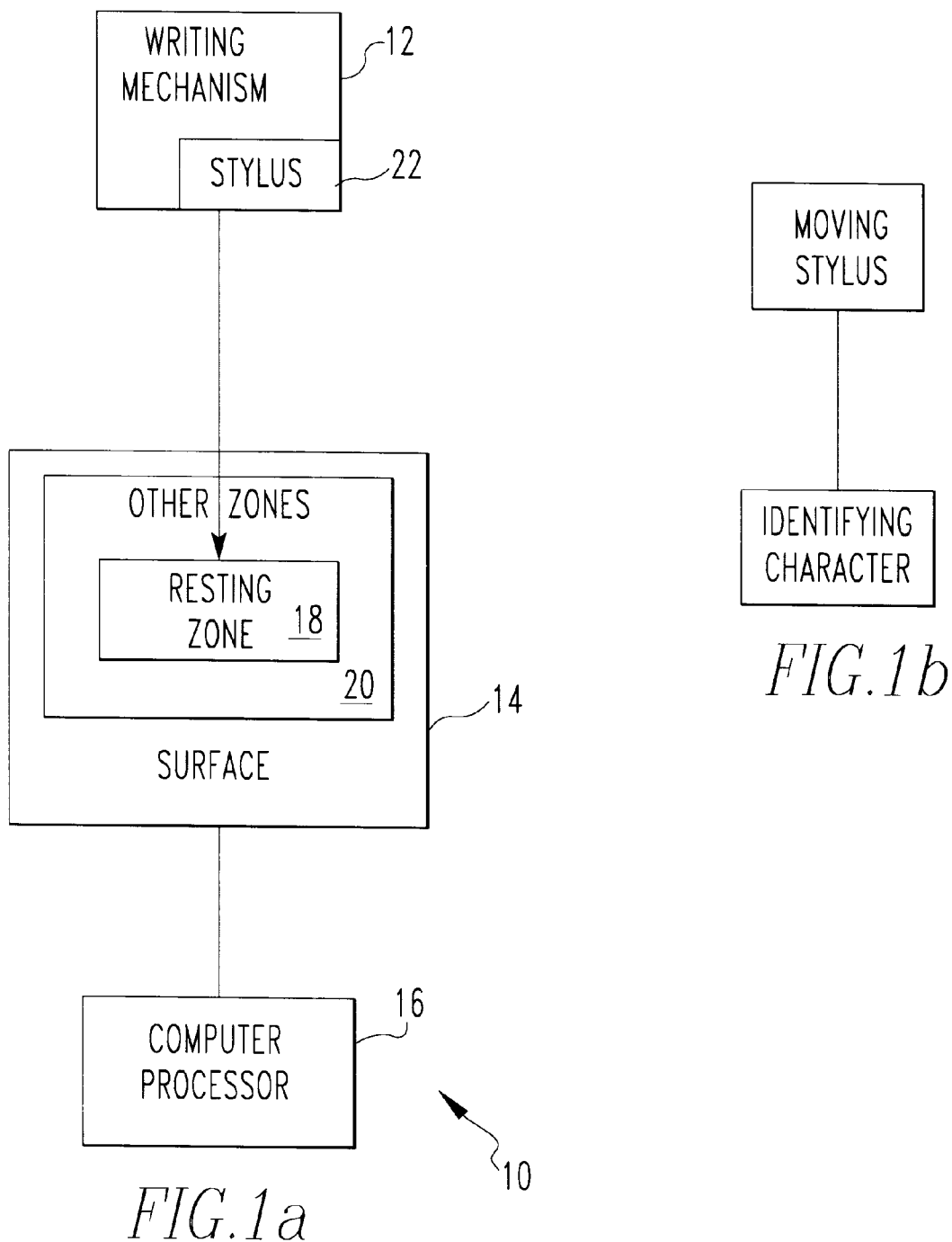

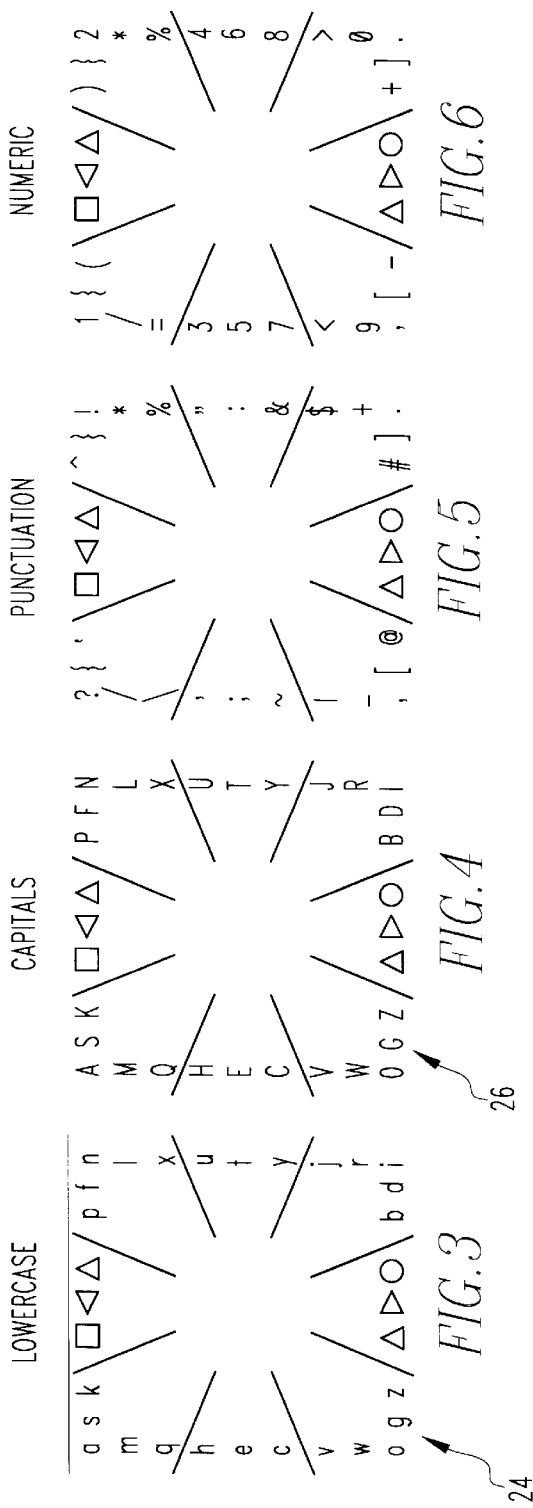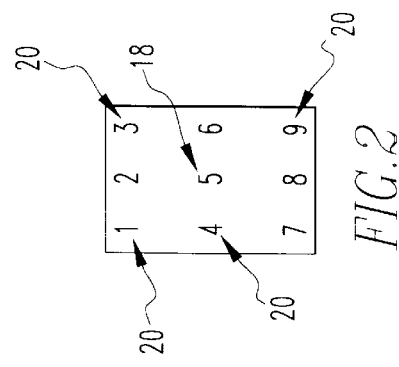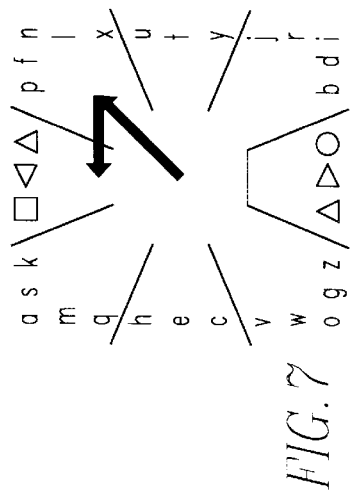

METHOD AND APPARATUS FOR WRITING

FIELD OF THE INVENTION

The present invention is related to a stylus based writing system. More specifically, the present invention is related to a stylus based writing system wherein the motion of the stylus allows for the writing of multi-word text of arbitrary length in a single continuous gesture.

BACKGROUND OF THE INVENTION

Currently, the fast methods available for entering text onto a stylus-based personal digital assistant (PDA) are about six times slower than a good touch-typist can achieve on a computer keyboard. This limits the use of stylus-based PDA's to short notes and messages.

Imagine you could write on a stylus-based PDA almost as fast as you could touch-type. Entire documents could be efficiently entered and edited. The stylus-based PDA would find completely new uses and far greater market penetration.

SUMMARY OF THE INVENTION

The present invention pertains to an apparatus for writing. The apparatus comprises a writing mechanism. The apparatus comprises a tablet surface sensitive to the position of the writing mechanism and able to detect whether the writing mechanism is in contact with the surface. The apparatus comprises a computer processor which identifies a writeable character from the motion of the writing mechanism from a resting zone into an other zone of a plurality of zones when the writing mechanism is in contact with the surface. The computer processor defines the surface into the resting zone and enough other zones to identify a written alphabet. Each other zone is in contact with the resting zone.

The present invention pertains to a method for writing. The method comprises the steps of moving a stylus from a resting zone on a tablet surface to at least an other zone of a plurality of zones in contact with the resting zone while the stylus is in continuous contact with the surface. The surface is sensitive to the position of the writing mechanism and able to detect whether the writing mechanism is in contact with the surface. Then there is the step of identifying a letter with a processor in contact with the surface from the movement of the stylus from the resting zone to at least the other zone and back to the resting zone.

BRIEF DESCRIPTION OF THE DRAWINGS

In the accompanying drawings, the preferred embodiment of the invention and preferred methods of practicing the invention are illustrated in which:

FIG. 1a is a schematic representation of an apparatus of the present invention.

FIG. 1b is a flow chart of the method of the present invention.

FIG. 2 is a schematic representation of a grid of zones.

FIG. 3 is a schematic representation of a lower case character set.

FIG. 4 is a schematic representation of a capital character set.

FIG. 5 is a schematic representation of a punctuation character set.

FIG. 6 is a schematic representation of a numeric character set.

FIG. 7 is a schematic representation of the writing sequence for letter f.

DETAILED DESCRIPTION

Referring now to the drawings wherein like reference numerals refer to similar or identical parts throughout the several views, and more specifically to FIG. 1a thereof, there is shown an apparatus 10 for writing. The apparatus 10 comprises a writing mechanism 12. The apparatus 10 comprises a tablet surface 14 sensitive to the position of the writing mechanism 12 and able to detect whether the writing mechanism 12 is in contact with the surface 14. The apparatus 10 comprises a computer processor 16 which identifies a writeable character from the motion of the writing mechanism 12 such as a stylus 22 from a resting zone 18 into an other zone 20 of a plurality of zones when the writing mechanism 12 is in contact with the surface 14. The computer processor 16 defines the surface 14 into the resting zone 18 and enough other zones 20 to identify a written alphabet. Each other zone 20 is in contact with the resting zone 18.

Preferably, the character is a letter. The writing mechanism 12 is preferably a stylus 22. Preferably, the motion of the stylus 22, which the computer processor 16 uses to identify letters, can write words by moving the stylus 22 in continuous multi-word text of arbitrary length in a single continuous gesture.

The motion of the stylus 22 on the surface 14 detected by the computer 16 preferably defines a letter by moving from the resting zone 18 to an other zone 20 and then back to the resting zone 18 from an other zone 20. Preferably, the other zones 20 include eight other zones 20.

The other zone 20 moved to from the resting zone 18 by the stylus 22 and back from the other zone 20 can be the same other zone 20. Alternatively, an other zone 20 the stylus 22 moves to from the resting zone 18 and back from an other zone 20 are different zones.

The present invention pertains to a method for writing, as shown in FIG. 1b. The method comprises the steps of moving a stylus 22 from a resting zone 18 on a tablet surface 14 to at least an other zone 20 of a plurality of other zones 20 in contact with the resting zone 18 while the stylus 22 is in continuous contact with the surface 14. The surface 14 is sensitive to the position of the writing mechanism 12 and able to detect whether the writing mechanism 12 is in contact with the surface 14. Then there is the step of identifying a letter with a processor 16 in contact with the surface 14 from the movement of the stylus 22 from the resting zone 18 to at least the other zone 20 and back to the resting zone 18.

Preferably, the moving step includes the step of moving the stylus 22 from a resting zone 18 on a tablet surface 14 to no more than two other zone 20s. The moving step preferably includes the steps of moving continuously the stylus 22 after the stylus 22 has been returned to the resting zone 18 to an other zone 20 and back to the resting zone 18. Then there is the step of identifying with the processor a letter associated with the moving continuously again step. Preferably, after the identifying step, there is the step of modifying a display of characters that the movement of the stylus 22 encode.

Preferably, the moving continuously step includes the step of continuously moving the stylus 22 to form multi-word text of arbitrary length in a single continuous gesture. The moving step preferably includes the steps of moving continuously the stylus 22 after the stylus 22 has been returned to the resting zone 18 to an other zone 20 and back to the resting zone 18. Then there is the step of identifying with the processor 16 a shift or lock key which switches a first set of characters 24 associated with the movement of the stylus 22 to a second set of characters 26 associated with the movement of the stylus 22.

In the operation of the preferred embodiment, the apparatus 10 comprises:

1. a computer processor 16.
2. a writing stylus 22
3. a tablet surface 14 sensitive to the position of the stylus 22, and able to detect whether the stylus 22 is in contact with the surface 14.

Usually on a PDA the tablet input surface 14 is part of a display screen, (eg: the 3COM PalmPilot or Apple MessagePad), but that is not necessary.

The process of operation from start to finish as seen by the user of the apparatus 10 is as follows. The user works with a very simple stylized alphabet, in which each character represents one character on the standard typewriter keyboard. The user sees a small writing area in which a number of zones 20 are arranged around a central resting zone 18. In one instantiation, the zones are arranged in a 3×3 grid as shown in FIG. 2.

In this 3×3 arrangement, for example, zone 5 is the resting zone 18. To form a character, the user drags the stylus 22 from the central resting zone 18 out to one of the eight outer zones, in this case 1,2,3,4,6,7,8, or 9, then optionally to a second outer zone, and finally back to the resting zone 18.

The gestures are arranged so that frequent characters can be drawn faster. For example, to draw space, e, t, a, o, or n, the user moves the stylus 22 from the resting zone 18 into only one other zone 20, and then immediately back again to the resting zone. To form other characters, the user moves the stylus 22 from the resting zone 18 first into one zone, and then into a second zone, before moving the stylus 22 back into the resting zone 18. Certain characters are shifting characters which change to alternate character sets, such as CAPITAL, PUNCTUATION, or NUMERIC. These alternate character sets contain additional characters.

The stylus 22 need never be lifted from the surface 14. Furthermore, the user need never stop moving the stylus 22. Continuous multi-word text of arbitrary length can be written fluidly, even in a single continuous gesture if desired.

The user can employ "quikwriting mode" (the technique of the present invention described herein) even in the middle of using the slower standard writing mode of the PDA. When the user wishes to enter "quikwriting mode", he/she draws a special gesture, which signals that the next stroke will be a quikwriting entry.

For example, when using the PalmPilot's standard Graffiti language, the user could draw a slash from the lower right to the upper left of the writing area (a gesture never used in Graffiti). Then the next time the user's stylus 22 touches down in the writing area, the PDA will be in "quikwriting mode". The PDA will stay in "quikwriting mode" until the user next lifts up the stylus 22, at which point the PDA will be placed back into standard Graffiti writing mode.

The internal sequence of operations of the apparatus 10 is as follows. A computer program well known in the art tracks the x,y position of the stylus 22, and outputs a token when the user's stylus 22 enters or leaves each of the nine zones. This sequence of tokens forms an alphabet, which is categorized by:

1. the first zone entered after leaving the resting zone 18.
2. the last zone exited before returning to the resting zone 18.

The above two zones may be the same. The indices of the two zones are used as a table lookup, to output a single character.

The sequence of operations is:

1. Begin with stylus 22 in the resting zone 18.
2. The computer 16 detects that the stylus 22 has moved out of the resting zone 18, into zone I.
3. The computer 16 detects that the stylus 22 has moved back into the resting zone 18, from zone J.
4. A table lookup is done, retrieving entry ch=C[I,J], where C is a two-dimensional table that stores the character of the current character set.
5. If ch is a shifting character, then either shift, lock, or unlock the alternate character set S associated with ch, as follows:
   1. if the current character set C is not S, then set C=S, and set locked=false
   2. else if not locked then set locked=true
   3. else set C=LOWERCASE and set locked=false
   return to step 1.
6. Output character ch. return to step 1.

There are four character sets: LOWERCASE, CAPITALS, PUNCTUATION, and NUMERIC. The default is LOWERCASE. The others are reached via shifting keys. Characters within these respective character sets are arranged as shown in FIGS. 3, 4, 5 and 6.

In the above alphabet, the shifting keys for CAPITALS, PUNCTUATION, and NUMERIC, are, respectively, up-arrow, rectangle, and circle. Every shifting key is present in every character set. The keys for space, backspace, and newline are, respectively, right-arrow, left-arrow, and down-arrow.

One can continually write without ever clicking any mouse buttons. Similarly, one can use this technique on a PDA without ever needing to lift the stylus 22 from the surface 14. It is preferred if there is present a first region in which the characters are displayed and another region in which the resting zone and the other zones are displayed.

The position of each printed character in the representation (which should be considered as a guide template which is optional) corresponds to how that character is drawn. Each printed character is positioned in one of the eight outer zones (its major zone), and also at some relative position within this zone (indicating its minor zone). To draw a stroke, one moves the stylus 22 from resting zone 18 shown as 5 to the character's major zone, then to the character's minor zone, and finally back to resting zone 18 shown as 5. If the major and minor zones of a character are the same, then to draw the character one needs only to move the stylus 22 from resting zone 18 shown as 5 out to the character's major zone and then back again.

For example, the letter f appears in zone 3 (the top-right zone). This is its major zone, indicating that one begins to draw the letter f by moving the stylus 22 from the central resting zone 18 shown as 5 to zone 3. Furthermore, the printed f is situated in the top-center of its major zone. Since the top-center zone is zone 2, this indicates that the character has minor zone 2. Therefore, one finishes drawing the letter f by moving the stylus 22 into zone 2, before returning it to resting zone 18 shown as 5. The drawing code for f is 32.

The first two strokes for the letter f is shown in FIG. 8. Returning the cursor to the center will then complete the character.

Some characters (the most frequent ones) require one to only to move out from zone 18 shown as 5 to one other zone 20, and then right back again. For example, the letter e appears in the middle-left edge of the middle-left zone; its major and minor zones are both 4. An e is drawn simply by moving the stylus 22 to the left, and back again to the center. The drawing code for e is 4.

There are three shifting keys: cap, alt, and num. Cap appears in drawing code position 23, alt in drawing code position 21, and num in drawing code position 89. These keys select for CAPITALS, PUNCTUATION, and NUMERIC characters, respectively. If a shifting key is triggered just once, then it only affects the next character drawn. If a shifting key is triggered twice in a row, then its character set locks on. Triggering a shifting key while its character set is already locked will cause the lock to release, and will revert to the default LOWERCASE character set.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

```
import java.awt.*;
public class Quikwrite extends Animator
{
    final char _ = 1;
    final char ALT = 2;
    final char CAP = 3;
    final char NUM = 4;
    boolean cap = false, capLock = false, alt = false, altLock = false;
    boolean num = false, numLock = false, isArrow = false;
    String output = "";
    char map[] = {
        'a', 's', 'k', 'm', _, _, 'q', _, _,
        ALT, '\b', CAP, _, _, _, _, _, _,
        'p', 'f', 'n', _, _, T, _, _, 'x',
        'h', _, _, 'e', _, _, 'c', _, _,
        _, _, _, _, _, _, _, _, _,
        _, _, 'u', _, _, 't', _, _, 'y',
        'v', _, _, 'w', _, _, 'o', 'g', 'z',
        _, _, _, _, _, _, '\n', ' ', NUM,
        _, _, 'j', _, _, 'r', 'b', 'd', 'i',
    };
    char altMap[] = {
        '?', '{', '"', '/', _, _, '\\', _, _,
        ALT, '\b', CAP, _, _, _, _, _, _,
        '^', '}', '!', _, _, '*', _, _, '%',
        '"', _, _, ';', _, _, '-', _, _,
        _, _, _, _, _, _, _, _, _,
        _, _, '"', _, _, ':', _, _, '&',
        '|', _, _, '-', _, _, ',', '[', '@',
        _, _, _, _, _, _, '\n', ' ', NUM,
        _, _, '$', _, _, '+', '#', ']', '.',
    };
    char capMap[] = {
        'A', 'S', 'K', 'M', _, _, 'Q', _, _,
        ALT, '\b', CAP, _, _, _, _, _, _,
        'P', 'F', 'N', _, _, 'L', _, _, 'X',
        'H', _, _, 'E', _, _, 'C', _, _,
        _, _, _, _, _, _, _, _, _,
        _, _, 'U', _, _, 'T', _, _, 'Y',
        'V', _, _, 'W', _, _, 'O', 'G', 'Z',
        _, _, _, _, _, _, '\n', ' ', NUM,
        _, _, 'J', _, _, 'R', 'B', 'D', 'I',
    };
    char numMap[] = {
        '1', '{', '(', '/', _, _, '=', _, _,
        ALT, '\b', CAP, _, _, _, _, _, _,
        ')', '}', '2', _, _, '*', _, _, '%',
        '3', _, _, '5', _, _, '7', _, _,
        _, _, _, _, _, _, _, _, _,
        _, _, '4', _, _, '6', _, _, '8',
        '<', _, _, '9', _, _, '.', '[', '-',
        _, _, _, _, _, _, '\n', ' ', NUM,
        _, _, '>', _, _, '0', '+', ']', '.',
    };
    static int zone = 0;
    static boolean drawGuide = true;
    private char map(int i, int j) {
        return ((cap || capLock) ? capMap :
            (num || numLock) ? numMap :
            (alt || altLock) ? altMap : map)[9*i + j];
    }
    public void render(Graphics g)
    {
        int w = width/2;
        int h = height;
        int p = 11, q = 38;
        int x0 = 0, x5 = x0 + w, x1 = x0 + w*p/q, x4 = x5 - (x1-x0);
        int y0 = 0, y5 = y0 + h, y1 = y0 + h*p/q, y4 = y5 - (y1-y0);
        int x2 = x1 + (x4-x1)*p/q, x3 = x4 - (x2-x1);
        int y2 = y1 + (y4-y1)*p/q, y3 = y4 - (y2-y1);
        if (keyDown) {
            for (int i = 0; i < 9; i++)
                for (int j = 0; j < 9; j++)
                    if (map(i,j) == (char)key) {
                        int a=x0+w/4,b=x0+w/2,c=x0+3;w/4;
                        int x[] = {a,b,c,a,b,c,a,b,c};
                        int d=y0+h/4,e=y0+h/2,f=y0+3*h/4;
                        int y[] = {d,d,d,e,e,e,f,f,f};
                        g.setColor(Color.black);
                        drawArrow(g,x[4],y[4],x[i],y[i], w/20);
                        drawArrow(g,x[i],y[i],x[j],y[j], w/20);
                        damage(0, 0, width/2, height);
                        isArrow = true;
                    }
            if (key == '/') drawGuide = !drawGuide;
        }
        if (loX < width/2) {
            g.drawLine(x1, y0, x2, y1);
            g.drawLine(x4, y0, x3, y1);
            g.drawLine(x1, y5, x2, y4);
            g.drawLine(x4, y5, x3, y4);
            g.drawLine(x0, y1, x1, y2);
            g.drawLine(x0, y4, x1, y3);
            g.drawLine(x5, y1, x4, y2);
            g.drawLine(x5, y4, x4, y3);
            if (drawGuide)
                for (int i = 0; i < 9; i++)
                    for (int j = 0; j < 9; j++) {
                        char ch = map(i,j);
                        if (ch != '~' && ch != _) {
                            int x = x0+(4*(i%3)+(j%3)+1)*(x5-x0)/12;
                            int y = y0+(4*(i/3)+(j/3)+1)*(x5-x0)/12;
                            switch (ch) {
                            case '\b':
                                drawTriangle(g,x+4,y-4,x-4,y+1,x+4,y+6);
                                break;
                            case '\n':
                                drawTriangle(g,x-5,y-4,x+3,y-4,x-1,y+6);
                                break;
                            case ' ':
                                drawTriangle(g,x-4,y-4,x+4,y+1,x-4,y+6);
                                break;
                            case CAP:
                                drawTriangle(g,x-3,y+6,x+5,y+6,x+1,y-4);
                                if (cap)
                                    drawTriangle(g,x-2,y+5,x+4,y+5,x+1,y-2);
                                if (capLock)
                                    fillTriangle(g,x-3,y+6,x+5,y+6,x+1,y-4);
                                break;
                            case ALT:
                                g.drawRect(x-5, y-4, 7, 10);
                                if (alt)
                                    g.drawRect(x-4, y-3, 5, 8);
                                if (altLock)
                                    g.fillRect(x-5, y-4, 7, 10);
                                break;
                            case NUM:
                                g.drawOval(x-3, y-4, 10, 10);
                                if (num)
                                    g.drawOval(x-2, y-3, 8, 8);
                                if (numLock)
                                    g.fillOval(x-3, y-4, 10, 10);
                                break;
                            default:
                                g.drawString("" + ch, x-2, y+4);
                                break;
```

APPENDIX-continued

```
      }
     }
    }
}
if (hiX > width/2) {
  g.setColor(Color.black);
  g.drawRect(0, 0, w, h-1);
  g.drawRect(w, 0, w-1, h-1);
  int x = w + 7;
  int y = 17;
  fo (int n = 0; n < output.length(); n++) {
    String s = output.substring(n, n+1);
    int dx = g.getFontMetrics().stringWidth(s);
    if (x + dx > 2*w - 7 || s.equals("\n")) {
      x = w + 7;
      y += 12;
    }
    if (! s.equals("\n")) {
      g.drawString(s, x, y);
      x += dx;
    }
  }
  g.setColor(Color.gray);
  g.fillRect(x, y-9, 7, 10);
}
noDamage();
if (isArrow && !keyDown) {
  damage(0, 0, width/2, height);
  isArrow = false;
}
  if (mouseMove || mouseDown || mouseDrag || mouseUp) {
    int n = 0, zoneMap[] = {4,7,6,8,3,5,0,2,1};
    if (above(x2,y4,x3,y4) + above(x3,y4,x4,y3) +
      above(x4,y3,x4,y2) + above(x4,y2,x3,y1) +
      above(x3,y1,x2,y1) + above(x2,y1,x1,y2) +
      above(x1,y2,x1,y3) + above(x1,y3,x2,y4) < 8) {
      \n = 1 + above(x1, y5, x4, y0) +
        2 * above(x1, y0, x4, y5) +
        2 * above(x0, y4, x5, y1) +
        2 * above(x0, y1, x5, y4);
      }
      if (zone != zoneMap[n])
        output(zone, zone = zoneMap[n]);
    }
  }
}
private void drawTriangle(Graphics g, int ax, int ay, int bx, int by,
int cx, int cy) {
  int x[] = {ax, bx, cx, ax};
  int y[] = {ay, by, cy, ay};
  g.drawPolygon(x, y, 4);
}
private void fillTriangle(Graphics g, int ax, int ay, int bx, int by,
int cx, int cy) {
  int x[] = {ax, bx, cx, ax};
  int y[] = {ay, by, cy, ay};
  g.filPolygon(x, y, 4);
}
private int above(int x1, int y1, int x2, int y2)
{
  return ((mousex-x1)*(y2-y1) - (mousey-y1)*(x2-x1) >
  0) ? 1 : 0;
}
private static int i = 4, j = 4;
private void output(int a, int b)
{
 if (a == 4)
  i = j = b;
 else if (b != 4)
  j = b;
 else {
  char c = map(i,j);
  i = j = 4;
  if (c == ALT) {
    if (alt) {alt = capLock = numLock = false; altLock = true;}
    else if (altLock) altLock = false;
    else {cap = capLock = num = numLock = false; alt = true; }
    damage(0, 0, width/2, height);
  }
  else if (c == CAP) {
```

APPENDIX-continued

```
    if (cap) {altLock = cap = numLock = false; capLock = true;}
    else if (capLock) capLock = false;
    else {alt = altLock = num = numLock = false; cap = true;}
    damage(0, 0, width/2, height);
  }
  else if (c == NUM) {
    if (num) {altLock = capLock = num = false; numLock = true;}
    else if (numLock) numLock = false;
    else {alt = altLock = cap = capLock = false; num = true;}
    damage(0, 0, width/2, height);
  }
  else if (c != '~' && c != _) {
    if (cap || alt || num)
      damage(0, 0, width/2, height);
    cap = alt = num = false;
    if (c == '\b') {
      if (output.length() > 0)
        output = output.substring(0, output.length()-1);
    }
    else
      output += c;
    damage(width/2, 0, width, height);
  }
 }
}
```

What is claimed is:

1. An apparatus for writing comprising:
   a writing mechanism;
   a tablet surface sensitive to the position of the writing mechanism and able to detect whether the writing mechanism is in contact with the surface; and
   a computer processor which identifies a writeable character from the motion of the writing mechanism from a resting zone into an other zone of a plurality of zones when the writing mechanism is in contact with the surface, said computer processor defining the surface into the resting zone and enough other zones to identify a written alphabet, each other zone in contact with the resting zone.

2. An apparatus as described in claim 1 wherein the character is a letter.

3. An apparatus as described in claim 2 wherein a writing mechanism is a stylus.

4. An apparatus as described in claim 3 wherein the motion of the stylus which the computer processor uses to identify letters can write words by moving the stylus in continuous multi-word text of arbitrary length in a single continuous gesture.

5. An apparatus as described in claim 4 wherein the motion of the stylus on the surface detected by the computer defines a letter by moving from the resting zone to an other zone and then back to the resting zone from an other zone.

6. An apparatus as described in claim 5 wherein the other zone moved to from the resting zone by the stylus and back from the other zone is the same other zone.

7. An apparatus as described in claim 6 wherein an other zone the stylus moves to from the resting zone and back from an other zone are different zones.

8. An apparatus as described in claim 7 wherein the other zones include eight other zones.

9. A method for writing comprising the steps of:
   moving a stylus from a resting zone on a tablet surface to at least an other zone of a plurality of zones in contact with the resting zone while the stylus is in continuous contact with the surface, said surface sensitive to the position of the writing mechanism and able to detect whether the writing mechanism is in contact with the surface;

identifying a letter with a processor in contact with the surface from the movement of the stylus from the resting zone to at least the other zone and back to the resting zone.

10. A method as described in claim 9 wherein the moving step includes the step of moving the stylus from a resting zone on a tablet surface to no more than two other zones.

11. A method as described in claim 10 wherein the moving step includes the steps of moving continuously the stylus after the stylus has been returned to the resting zone to an other zone and back to the resting zone, and identifying with the processor a letter associated with the movement of the stylus.

12. A method as described in claim 11 wherein the moving continuously step includes the step of continuously moving the stylus to form multi-word text of arbitrary length in a single continuous gesture.

13. A method as described in claim 12 wherein the moving step includes the steps of moving continuously the stylus after the stylus has been returned to the resting zone to an other zone and back to the resting zone, and identifying with the processor a shift or lock key which switches a first set of characters associated with the movement of the stylus to a second set of characters associated with the movement of the stylus.

14. A method as described in claim 13 including after the identifying step, there is the step of modifying a display of characters that the movement of the stylus encode.

* * * * *